P. C. HOUSE.
Wheels for Vehicles.
No. 141,715. Patented August 12, 1873.
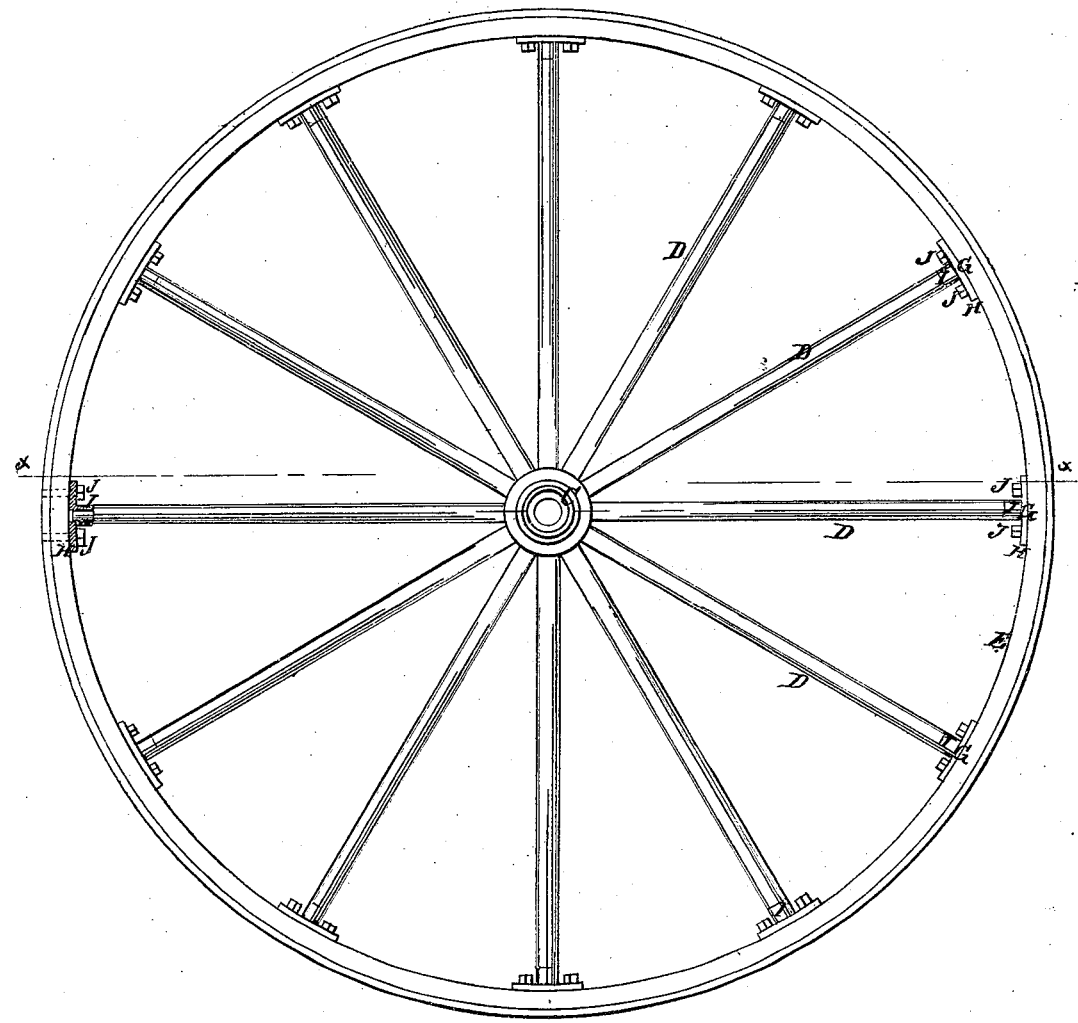
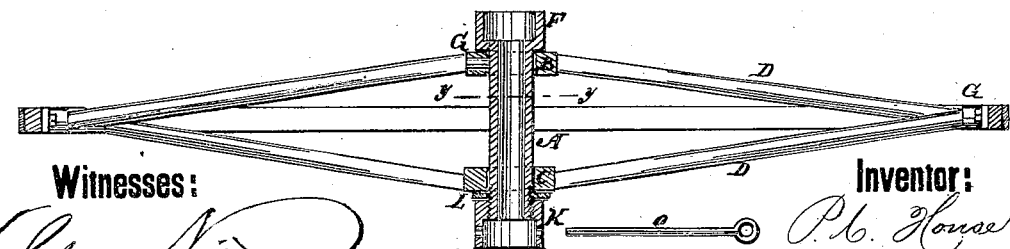
Witnesses:
Inventor:
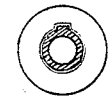

UNITED STATES PATENT OFFICE.

PHILANDER C. HOUSE, OF WEST RANDOLPH, VERMONT.

IMPROVEMENT IN WHEELS FOR VEHICLES.

Specification forming part of Letters Patent No. 141,715, dated August 12, 1873; application filed March 15, 1873.

*To all whom it may concern:*

Be it known that I, PHILANDER C. HOUSE, of West Randolph, in the county of Orange and State of Vermont, have invented a new and useful Improvement in Carriage-Wheels, of which the following is a specification:

The invention consists in the improvement of wheels, as hereinafter described and pointed out in the claim.

Figure 1 is a side view of a wheel made according to my invention. Fig. 2 is a cross-section of the wheel taken on the line $x\ x$ of Fig. 1. Fig. 3 is a cross-section of the box on the line $y\ y$.

Similar letters of reference indicate corresponding parts.

A represents the pipe axle-box. B C are the hubs of the two sets of spokes. D are the spokes. E represents the felly. The inner end of the axle-box is constructed with a recess and band, F, for receiving the axle in the ordinary manner, which makes a shoulder, G, on the box, against which the hub B bears. The two sets of spokes are so placed in their hubs that when the hubs are separated or spread apart, as seen in Fig. 2, their outer ends converge to one line, and are attached to the inner side of the felly by means of the thimble-tees G. This thimble-tee consists of a plate, H, and a thimble or socket, I. The plate is secured to the felly by the bolts J J. These bolts pass through the tire as well as the felly, and secure the tire to the felly.

By removing the bolts any one of the spokes can be detached, and a new spoke substituted in case of failure.

The hub C slides on the box, and the two hubs are made to approach each other by means of the screw-cap K, the outer portion of which forms a band over the end of the axle. The cap screws onto the end of the box and bears against the hub; but there may be a washer, L, between, as seen in the drawing.

The two sets of spokes, with their hubs arranged on the box, as in Fig. 2, stand bracing from a central line to the felly, so that when the hubs are made to approximate or approach each other the angle of the spokes lessen, and their ends are thrust outward, thus expanding the felly and tightening the tire thereon. When the tire becomes at all loose from wear it is only necessary to screw up the cap K on the box by means of the pin O, which pin is passed through holes in the cap, the holes being shown in the drawing.

If a spoke fails it is only necessary to remove the bolts J J, when the thimble-tee is detached from the felly, the spoke removed, and a new one put in its place.

The advantages are, that from the bracing position of the spokes the wheel is stronger than wheels of ordinary construction. It can always be kept with a tight tire, and if a spoke fails it can be renewed without disturbing the felly. A very strong wheel can be made in this manner, with the hubs and other parts much lighter than is required for ordinary wheels. The hub of this wheel works on a feather, P, on the box, as seen in Fig. 3, so that the box and the hub must turn together.

Having thus described my invention, I claim as new and desire to secure by Letters Patent—

The combination of the axle-nut K, the hub-ring B having the peculiarly-shaped mortise, and the thimble tee or clip G having the socket I, for the purpose of easily applying and removing the spoke, all as set forth.

PHILANDER C. HOUSE.

Witnesses:
   HAZEN P. SANFORD,
   GILBERT TILSON.